(No Model.)

J. DU SHANE.
VEHICLE AXLE.

No. 259,114. Patented June 6, 1882.

Witnesses:
H. C. McArthur
W. R. Keyworth

Inventor:
James Du Shane
per T. A. Alexander
Attorney.

UNITED STATES PATENT OFFICE.

JAMES DU SHANE, OF SOUTH BEND, INDIANA.

VEHICLE-AXLE.

SPECIFICATION forming part of Letters Patent No. 259,114, dated June 6, 1882.

Application filed April 18, 1882. (No model.)

*To all whom it may concern:*

Be it known that I, JAMES DU SHANE, of South Bend, in the county of St. Joseph and State of Indiana, have invented certain new and useful Improvements in Axles; and I do hereby declare that the following is a full, clear, and exact description thereof, reference being had to the accompanying drawings, and to the letters of reference marked thereon, which form part of this specification, in which—

Figure 1:
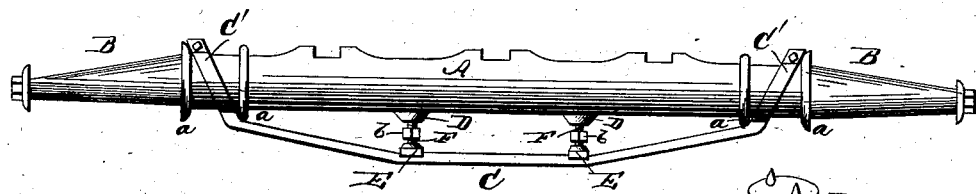
Figure 2:
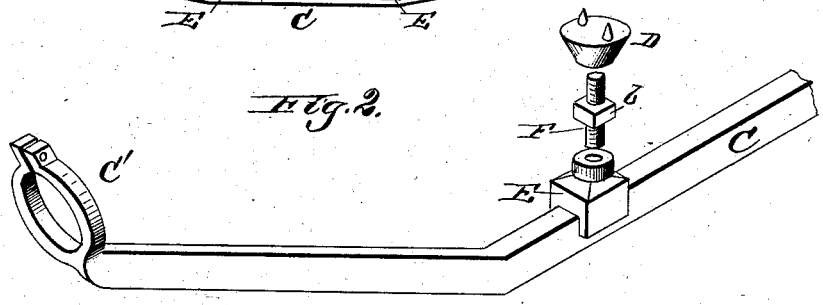
Figure 3:
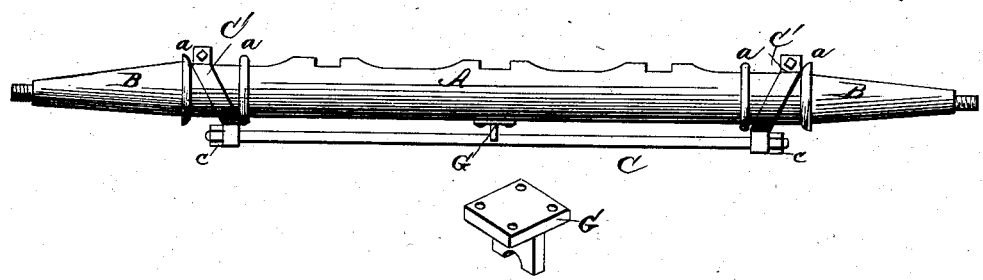

Figure 1 is a side elevation; Fig. 2, a detail perspective. Fig. 3 is a modification of my invention.

My invention relates to an improvement on wooden axles, the object of which is to prevent these axles from sagging; and the nature of my invention consists in a novel kind of arched brace, adjusting devices therefor, and oblique clips, as will be understood from the following description when taken in connection with the annexed drawings.

A designates a wooden wagon or cart axle, and B B are the skeins on the arms thereof, which skeins are constructed with collars or annular flanges $a\ a$, as shown.

C designates a brace-rod, which is provided on its ends with clips or loops C' C', which clasp the skeins B B between their collars $a\ a$ and are firmly secured to the skeins. The clasping ends of the brace-rod are oblique to the length of the axle, and this brace-rod C may be bowed downward, or it may be parallel with the axle. Between the ends of this rod I apply riding-washers which are screw-tapped, the thread being cut, say, right-handed.

D D are conical washers, which are screw-tapped left-handed, and which are preferably constructed with spurs on their bases, which penetrate the lower surface of the axle and take a firm hold when pressure is applied to them, so that they will not slip. The riding-washers E are applied on the brace-rod C, as shown, and the conical washers are arranged directly above them against the bottom of the axle.

F F designate right and left handed screws, which are constructed with nuts $b$, and which are tapped into the respective washers.

To restore a bent axle it is only necessary to turn the screws F in the proper direction by means of a wrench applied to the nuts on these screws, thus exerting a pressure on bar C and axle until the axle is sprung back to its normal position. The brace then acts as a truss-support for the axle.

In the modification, Fig. 3, wherein I show a straight brace-rod, eyes are formed on the oblique clips C', through which pass loosely the screw-threaded ends of the said brace-rod, and receive on them nuts $c\ c$, by turning which the bent axle can be returned to its normal position. At the middle of the length of the straight brace-rod is a fulcrum-plate, G, which is applied between this rod and the bottom of the axle.

All wooden axles, when heavily loaded, spring more or less, and if used for some time under strain become permanently bent. This throws the wheels out at the bottom, so that they no longer run on a plumb spoke, which of course increases their chances of breaking down. Further than this, the cast-iron skeins upon which the wheels revolve draw loose, and there is no way of tightening them or holding them to their place as wagons are usually made. This invention will remedy both these defects and increases the strength of the axle.

Having thus fully described my invention, what I claim as new, and desire to secure by Letters Patent, is—

1. The brace-rod C, provided at each end with diagonal brace-clips C' C', in combination with axle A and skeins B B, said skeins having collars $a\ a$, all constructed and arranged to operate as set forth.

2. The combination of axle A, conical washers D D, riding-washers E E, nuts $b\ b$, and brace-rod C, having diagonal brace-clips C' C', all arranged to operate substantially as described.

In testimony that I claim the foregoing as my own I affix my signature in presence of two witnesses.

JAMES DU SHANE.

Witnesses:
WILLIS A. BUGBEE,
ROBERT P. KIZER.